United States Patent [19]
Black

[11] 3,746,099
[45] July 17, 1973

[54] METHOD AND APPARATUS FOR PICKING UP LITTER

[76] Inventor: John Dennis Black, 3107 Bell Drive, Augusta, Ga. 30906

[22] Filed: Aug. 20, 1971

[21] Appl. No.: 173,609

[52] U.S. Cl. .................................. 171/63, 56/328
[51] Int. Cl. ............................................ A01b 43/00
[58] Field of Search ............................ 171/63, 53; 56/328 R; 172/350

[56] References Cited
UNITED STATES PATENTS

| | | | |
|---|---|---|---|
| 1,565,162 | 12/1925 | King | 56/328 R |
| 3,451,488 | 6/1969 | Taketa | 172/350 |
| 2,482,355 | 9/1949 | McBride | 56/328 R |

*Primary Examiner*—Antonio F. Guida
*Attorney*—Beveridge & DeGrandi

[57] ABSTRACT

Method and apparatus for picking up litter wherein a drum having a plurality of substantially rigid metallic tines projecting radially therefrom is rolled over litter to pick up the same on the ends of the tines and then to carry it into engagement with a plurality of stripper members which remove the litter and guide the same into a receptacle positioned forwardly of the tine and drum assembly. The apparatus may be connected to the rear of a vehicle for movement over the litter by means of a tow bar fixed to the receptacle; the tow bar including side members projecting rearwardly from the receptacle for journaling the drum in the extremities thereof. The stripper members are arcuate having their forward ends suitably fixed to a portion of the receptacle while extending rearwardly from the receptacle between adjacent rows of tines below the extremities thereof.

4 Claims, 1 Drawing Figure

Patented July 17, 1973
3,746,099
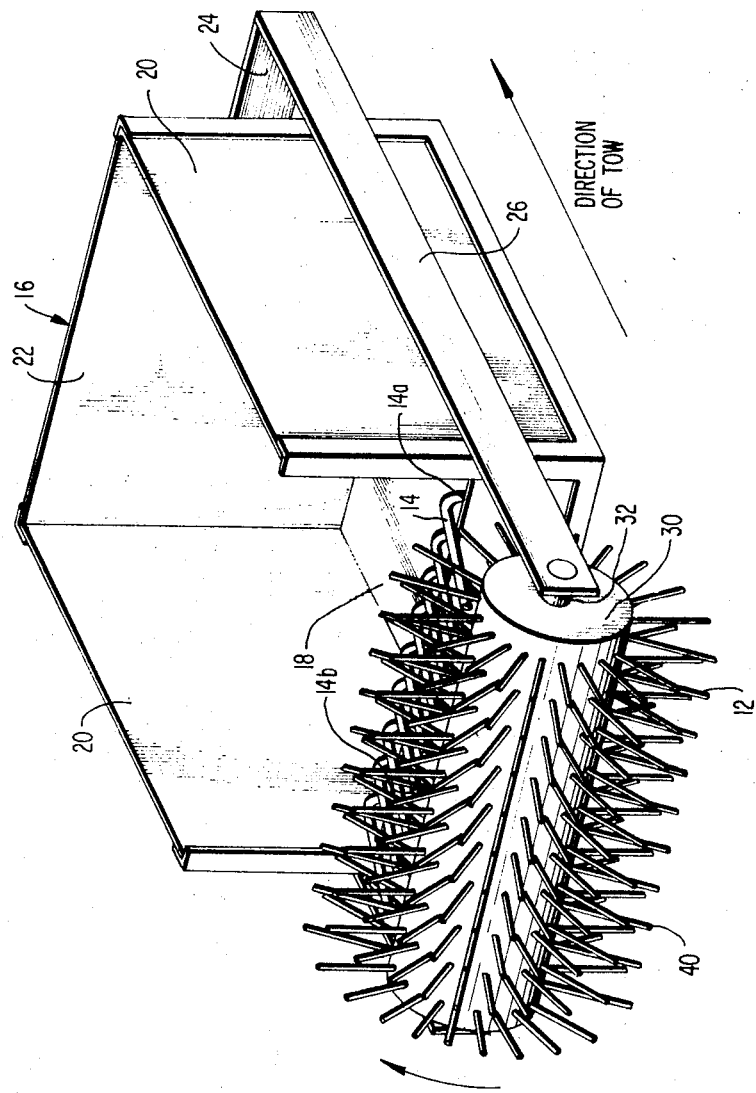
INVENTOR
JOHN DENNIS BLACK
BY Beveridge & DeGrandi
ATTORNEYS

METHOD AND APPARATUS FOR PICKING UP LITTER

OBJECTS OF INVENTION

The present invention relates to method and apparatus for picking up litter and depositing the same in a collection receptacle.

It is an object of the present invention to provide a novel method and apparatus for picking up litter and depositing the same in a collection basket; the type of litter including metallic drink cans, paper, cardboard, wood pieces, and other penetrable objects.

A further object of the present invention is to provide such a method and apparatus which may be utilized in conjunction with a vehicle such as a tractor which will pull the apparatus over a course or other littered area.

A further object of the present invention is to provide such an apparatus which may be easily operated to provide effective litter pick-up over extended periods of repeated use and without breakdown. Included herein is a provision of such apparatus which requires no supervision or manual assistance in operation.

A still further object of the present invention is to provide such an apparatus which will achieve the above objects and yet may be manufactured with standard parts and a durable construction for retail at relatively low prices.

SUMMARY OF INVENTION

The above and other objects are achieved in an apparatus including a rotatable drum having projecting radially outwardly therefrom, a plurality of tines arranged in several rows or groups with each row including a plurality of tines angularly spaced about the drum. The tines are formed from a suitable material such as tubular steel or steel rods of sufficient strength to be self-supporting and to support the drum above the surface of the ground being traveled. The extremities of the tines are preferably formed with sharp edges to facilitate penetration into the litter; the strength of the tines being sufficient to enable such penetration without permanent deformation or breakage of the tines.

The drum with the tines thereon is mounted for rolling movement over the ground surface in portions of a litter collection receptacle positioned forwardly of the tine and drum assembly to receive the litter from the tines as the latter rotates toward the receptacle. In one embodiment, the receptacle has a generally box-like configuration including a base, opposite side walls projecting upwardly from the base and a front wall extending transversely between the side walls. The rear end of the receptacle is open to enable the litter to be deposited into the receptacle. Additionally, in the preferred embodiment, the receptacle is provided with a tow bar enabling the assembly to be mounted or hitched to the rear of a vehicle such as a tractor to enable it to be pulled over the ground surface with the tines adapted to engage the ground surface to penetrate and pick up litter. In the preferred embodiment, the tow bar includes opposite side members projecting on opposite sides of the receptacle and rearwardly from the receptacle for rotatably receiving shaft portions projecting from the opposite ends of the drum for rotatably mounting the drum relative to the receptacle.

Litter picked up by the tines is removed from the tines for deposit into the receptacle by a plurality of stripper members. The ends of the stripper members are fixed to the base of the receptacle and extend arcuately and rearwardly between adjacent rows of tines below the extremities of the tines for engaging litter impalled on the tines and for removing the same from the tines and guiding the same forwardly and downwardly into the receptacle.

DRAWINGS

Other objects and advantages of the present invention will become apparent from the description appearing below taken in conjunction with the attached drawing in which there is illustrated a perspective view of apparatus embodying the invention for picking up litter.

DETAILED DESCRIPTION

Referring now to the drawings in detail, there is shown for illustrative purposes only an apparatus for picking up litter in accordance with the present invention, the apparatus basically including a tine and drum assembly generally designated 12 for picking up litter from the ground, a stripper unit comprised of a plurality of strippers 14 for removing litter from the tines, and a collection receptacle or basket 16 for receiving litter removed from the tines by the strippers 14.

In the illustrated embodiment, the collection receptacle 16 has a generally box-like configuration including a rectangular base 18 having upstanding parallel side walls 20 and a transverse front wall 16 extending between and suitably fixed to side walls 20 to define a space for receiving litter. To enable the apparatus to be hitched to the rear of a vehicle such as a trailer, receptacle 16 has a tow bar 24 fixed across its front end with a suitable hitch thereon. Additionally, tow bar 24 has a plurality of rearwardly extending side members 26 extending along and fixed to the opposite side walls 20 or base of the receptacle with the extremities thereof projecting from the rear of the receptacle for mounting the drum and tine assembly for rotation therein.

The drum and tine assembly 12 includes a cylindrical drum 30 having shafts 32 projecting axially from the opposite ends thereof and received for rotation in the ends of the tow bar side members 26 as shown in the drawings. Drum 30 may be made from any suitable metallic material. Extending radially outwardly from the drum about circumferentially spaced portions thereof, are a plurality of steel tines 40 arranged in a series of groups or rows spaced longitudinally along the drum with each row or group of tines 40 containing a plurality of angularly spaced tines 40 shown as being equiangularly spaced about the drum. Tines 40 are made of sufficient strength to resist permanent deformation while supporting the drum relative to the ground surface and further to enable tines 40 to penetrate litter such as metallic cans, paper, cardboard, pieces of wood and other penetrable objects. In this latter regard, the extremities of tines 40 are formed with sharp edges to facilitate penetration in the litter. Tines 40 may be made from any suitable material such as steel rods or tubes.

In order to remove litter impalled on tines 40 for deposit into receptacle 16, a plurality of stripper members 14 are mounted between each group of tines to engage the litter as it rotates towards the collection basket while impalled on tines 40. Stripper members 14 may be made from any suitable strong material such as steel rods and in the shown embodiment have an arcuate shape with the forward ends 14a rigidly fixed to the base 18 of the collection basket and extending arcuately rearwardly between adjacent groups of tines. Additionally, the level of stripper members 14 is below the extremities of tines 40 as shown in the drawings. The rear free edges 14a of strippers 14 are located approximately above the axis of the drum and preferably offset towards the receptacle. This will ensure that when the litter is removed from the tines by the strippers 14, litter will be positioned so that it will move forwardly under the guidance of strippers 14 towards the collection receptacle and ultimately in collection receptacle 16. Since the stripper members 14 are inclined downwardly towards the basket, this will aid in moving the litter downwardly into the collection receptacle 16.

In use, the apparatus may be hitched to a vehicle (not shown) and moved over a course containing litter. As the tines rotate in the clockwise direction shown in the drawings, they will engage and penetrate through litter after which the litter will move in the clockwise direction while impalled on the tines until it reaches stripper members 14 which then will engage and force the litter off the tines. Subsequently, the tines 40 together with the stripper members 14 will move and guide the litter further in the clockwise direction and downwardly into receptacle 16.

It will be apparent that the size of the apparatus may be modified to meet a variety of needs. Additionally, the apparatus could be arranged in multiples to cover large areas such as ball parks, drive-in theatres, golf courses, play grounds, parking lots, airports, beaches, etc. Additonally, a single small unit can be designed to serve a highway shoulder area.

I claim:

1. Apparatus for picking up litter comprising in combination; receptacle means defining a receptacle having a forward end with hitch means on the forward end for hitching the apparatus to a vehicle to be pulled thereby, said receptacle means including a base, a front wall and opposite side walls upstanding from the base to define the receptacle with an open end in the rear of the receptacle, a cylindrical drum, means on the receptacle mounting the cylindrical drum for rotation across the rear open end of the receptacle, a plurality of substantially rigid elongated tines fixed to the drum in groups spaced along the longitudinal axis of the drum with spaces between each of said groups of tines and with the tines in each group extending radially outwardly from the drum at locations about the periphery of the drum, said drum being supported on the ground solely by said tines, said tines having sharp edges on their extremities for facilitating penetration in litter, and stripper means for removing litter impaled on said tines and for guiding the same forwardly into said receptacle, said stripper means including a plurality of substantially rigid elongated stripper members fixed to the base of the receptacle at the open end thereof and respectively extending rearwardly between said groups of said tines in said spaces, the extremities of said stripper members being directed toward the axis of the drum but offset towards the receptacle in a plane substantially below the extremities of said tines, said stripper members extending arcuately from their free end extremities forwardly and downwardly towards the receptacle.

2. Apparatus defined in claim 1 wherein said means mounting said drum includes a pair of mounting members fixed to the opposite sides of the receptacle and projecting rearwardly therefrom, and wherein said drum is mounted for rotation in said mounting members, and said mounting members extend to the front of the vehicle and support said hitch means.

3. Apparatus defined in claim 1 wherein said tines are formed from straight elongated steel tubes extending a substantial distance from the drum.

4. Apparatus defined in claim 1 wherein said tines are made from straight elongated steel rods extending a substantial distance from the periphery of the drum.

* * * * *